(12) United States Patent
Wang

(10) Patent No.: US 7,316,827 B2
(45) Date of Patent: Jan. 8, 2008

(54) FLOUR COMPOSITION CONTAINING NON-WHEAT CEREAL COMPONENTS, AND PASTA NOODLES PRODUCED THEREFROM

(75) Inventor: Shing-Jung Wang, Taipei (TW)

(73) Assignee: Standard Foods Corporation, Taipei (TW)

( * ) Notice: Subject to any disclaimer, the term of this patent is extended or adjusted under 35 U.S.C. 154(b) by 281 days.

(21) Appl. No.: 10/779,913

(22) Filed: Feb. 17, 2004

(65) Prior Publication Data

US 2004/0175478 A1    Sep. 9, 2004

Related U.S. Application Data

(63) Continuation of application No. 10/628,502, filed on Jul. 28, 2003, now Pat. No. 7,097,275.

(30) Foreign Application Priority Data

Mar. 7, 2003    (TW) .............................. 92104950 A

(51) Int. Cl.
*A23L 1/10*    (2006.01)
*A23L 1/16*    (2006.01)
(52) U.S. Cl. ...................... 426/622; 426/448; 426/451; 426/501; 426/573; 426/640; 426/656
(58) Field of Classification Search ................ 426/622, 426/640, 448, 451, 501, 573, 656
See application file for complete search history.

(56) References Cited

U.S. PATENT DOCUMENTS

| | | | |
|---|---|---|---|
| 2,819,969 | A | 1/1958 | Grandel |
| 3,162,536 | A | 12/1964 | Kaufmann |
| 3,846,563 | A | 11/1974 | Cunningham |
| 4,098,906 | A | 7/1978 | Hisaki et al. |
| 4,230,735 | A | 10/1980 | Yoshida et al. |
| 4,394,397 | A | 7/1983 | Lometillo et al. |
| 4,414,235 | A | 11/1983 | Takekoshi |
| 4,623,548 | A | 11/1986 | Willard |
| 4,976,982 | A | 12/1990 | Gillmore et al. |
| 5,057,330 | A | 10/1991 | Lee et al. |
| 5,384,136 | A * | 1/1995 | Lai et al. ...................... 426/19 |
| 5,480,669 | A | 1/1996 | Zallie et al. |
| 5,500,236 | A | 3/1996 | Miller et al. |
| 5,514,397 | A | 5/1996 | Shapiro |
| 5,562,938 | A | 10/1996 | Lee et al. |
| 5,695,804 | A | 12/1997 | Hnat et al. |
| 5,789,012 | A | 8/1998 | Slimak |
| 6,022,575 | A | 2/2000 | Lee et al. |
| 6,042,867 | A | 3/2000 | Hoshino et al. |
| 6,120,826 | A | 9/2000 | Meyer et al. |
| 6,180,148 | B1 * | 1/2001 | Yajima ........................ 426/392 |
| 6,197,360 | B1 | 3/2001 | Murofushi et al. |
| 6,242,014 | B1 | 6/2001 | Xu |
| 6,242,032 | B1 | 6/2001 | Meyer et al. |
| 6,403,127 | B1 | 6/2002 | Yamazaki et al. |
| 6,551,645 | B1 | 4/2003 | Hauser et al. |

| | | | |
|---|---|---|---|
| 2005/0142273 | A1 * | 6/2005 | Schellhaass et al. ........ 426/549 |

FOREIGN PATENT DOCUMENTS

| | | |
|---|---|---|
| CN | 1252950 A | 10/1998 |
| CN | 1252950 | 5/2000 |
| EP | 0 412 639 | 2/1991 |
| EP | 0 412 639 | 8/1993 |
| EP | 0 369 175 | 11/1994 |
| JP | 58-134957 | 8/1983 |
| JP | 359102362 | 6/1984 |
| JP | 61-025455 | 2/1986 |
| JP | 02-255053 | 10/1990 |
| JP | 407250638 | 10/1995 |
| JP | 10-327739 | 12/1998 |
| JP | 2000-342207 | 12/2000 |

OTHER PUBLICATIONS

Hunter, B. The Natural Foods Cookbook, Simon and Schuster, NY, 1961, pp. 167, 171, 172.*
Marconi et al.; "Composition and Utilization of Barley Pearling By-Products for Making Functional Pastas Rich in Dietry Fiber and B-Glucans," *Ceral Chemistry*, vol. 77(2): 133-139 (2000).
Sgrulletta et al.; "Influence of different naked-oat bultivars on the nutritional value of pasta," *Technica Molitoria International*, Feb. 2003, pp. 125-130.
Internet page; *Epicurious the World's Greatest Recipe Collection*, "Gluten," May 14, 2004, 2 pgs.
Internet page; saramoulton.com, "What is the difference between semolina and durum flour?," Sep. 23, 2003, 1 page.
Internet page; *North Dakota Wheat Commission*, "Wheat Information: Durum Wheat," Sep. 23, 2003, 1 pg.
Internet page; *North Dakota Wheat Commission*, "Wheat Information," Sep. 23, 2003, 1 pg.
Internet page; *Epicurious The World's Greatest Recipe Collection*, "wheat," Sep. 23, 2003, 2 pgs.
Internet page; *Canadian Grain Commission*, "The Use of Rheological Techniques to Elucidate Durum Wheat Dough Strength Properties," Sep. 23, 2003, 3 pgs.
Internet page; *Nerac* "Retro search: Pasta With Wheat and Oats" Aug. 28, 2003, 17 pgs.
Internet page; *California Wheat Cimmision*, "Description of Durum Semolina Quality Factors," Sep. 23, 2003, 3 pgs.
Internet page: Gabrovska D. et al., "Naked Oat (*Avena nuda L.*) During Germination", *Czech Journal of Food Sciences*, vol. 22, 2004, pp. 317-320.
Internet page: Katherine Czapp, "Naked Oats", *Wise Traditions in Food, Farming and the Healing Arts*, Summer 2006.

* cited by examiner

*Primary Examiner*—Helen Pratt
(74) *Attorney, Agent, or Firm*—Welsh & Katz, Ltd.

(57) ABSTRACT

The subject invention, therefore, comprises pasta noodles that have wheat grain and non-wheat grain in sufficient quantities as will form a matrix to provide the appropriate texture to the pasta noodles.

16 Claims, No Drawings

FLOUR COMPOSITION CONTAINING NON-WHEAT CEREAL COMPONENTS, AND PASTA NOODLES PRODUCED THEREFROM

The subject application is a continuation of U.S. Ser. No. 10/628,502, filed Jul. 28, 2003.

CROSS-REFERENCE TO RELATED APPLICATION

This application claims priority of Taiwanese Application No. 092104950, filed on Mar. 7, 2003, and U.S. Ser. No. 10/628,502, filed Jul. 28, 2003.

FIELD OF THE INVENTION

The invention relates to food products, and more particularly to food products containing both wheat and no-wheat components. This invention also relates to pasta noodle produced from such food products.

BACKGROUND OF THE INVENTION

Present commercially available cereal noodles can contain non-wheat cereal flours, such as oat flour, buckwheat flour, barley flour, pearl barley flour, rice flour, brown rice flour, and the like, which makes it difficult to form a matrix or net-like structure when making dough from such cereal flours. As a result, such non-wheat cereal flours in present commercially available pasta noodles should be controlled to be in only minor amounts. Otherwise, such pasta noodles with large amounts of non-wheat flour do not have the good mouthfeel or texture that is preferred by customers.

Health considerations generally dictate that it is desirable to ingest at least a minimum amount of both wheat and non-wheat cereal daily. Therefore, it is generally recommended that a person include wheat and a non-wheat cereal, such as oats, as part of a daily diet regimen. There are three major types of wheat: hard wheat, soft wheat and durum wheat. Hard wheat and soft wheat are generally used for baking, while durum wheat is used for pasta noodles, when ground into semolina.

Oat is a nutritious and calorie-proper food ingredient because it contains a great amount of water soluble fibers, $\beta$-glucan, proteins, vitamins, and mineral substance. Further, oat-containing food products are known to lower cholesterol. Thus, one may reduce the risk of cardiovascular disease by consuming oat-containing food products containing more than 3 grams of $\beta$-glucan per day, when taken as part of a diet with a low fat and cholesterol content.

However, oat only contains 2 to 6% by weight of $\beta$-glucan. Therefore, it is necessary to eat 50 to 150 grams of oat each day in order to ingest 3 grams of $\beta$-glucan per day. With such a large requirement, oats become a major part of the diet just to fulfill the requirement of sufficient $\beta$-glucan each day, and as a result can be onerous to do so.

Further, it is not possible to ingest enough $\beta$-glucan each day from the present commercially available oat-containing food products, such as cookies, breakfast cereals and the like, as such food products do not contain a sufficient amount of oat ingredients.

Therefore, it is highly desirable to have a food product such as a pasta noodle which is easy to chew, and which contains a sufficient amount of the aforesaid wheat and non-wheat cereal.

Conventional noodles contain wheat flour as the main ingredient. Wheat flour usually includes about 9 to 14% by weight protein and 75 to 80% by weight starch as the two main components for forming the structure of the dough.

The protein contained in the wheat flour generally has about 80% of water soluble gluten protein. The gluten protein is mainly composed of glutenin and gliadin. The glutenin is an alkaline soluble protein, and has double sulfur bonds for end linking subunits and providing extensibility for the dough. The gliadin is an alcohol soluble protein, and has intramolecular double bonds for providing elasticity for the dough. Additionally, the protein contained in the wheat flour has about 20% water soluble and salt soluble protein which contains a large amount of thiol amino acid for providing a net-like or matrix structure during the production of the dough.

The starch contained in the wheat flour generally includes about 25% amylose and about 75% amylopectin, comprising two groups of starch when viewed by starch granule size. When wheat flour is used for producing the dough, the aleurone formed by the combination of the starch granule and the protein contained in the wheat flour is decomposed. The starch granules are dispersed and inlaid into the net-like structure so as to form a firm structure with the protein. The dough having a net-like structure is subsequently processed by sheeting, combining, rolling, and cutting to form the pasta noodle.

As stated, pasta noodle is generally made with durum wheat as a main ingredient. Durum wheat and hard or soft wheat are different from each other in chemical composition and physical properties. Although, durum wheat contains a great amount of protein, the gluten thereof has considerable flexibility with thermosetting properties. Furthermore, the gelling property of the starch contained in the durum wheat and the processing conditions for producing pasta noodles are different from those for pasta noodles made from hard or soft wheat. Therefore, the color, taste, texture, and mouthfeel characteristics of durum wheat pasta noodles are different from those of the hard or soft wheat pasta noodles.

As described above, although hard or soft wheat pasta noodles and durum wheat pasta noodles are different in the type of wheat flour and processing conditions, the principles for making the respective pasta noodles are similar, i.e., by forming a net-like structure via the protein and the starch contained in the flour.

Although oat flour contains 12 to 15% by weight of protein, it is devoid of a sufficient proportion of gluten protein for forming the necessary net-like structure during the production of the dough. It is difficult to process the oat dough into conventional pasta noodles by a conventional process and apparatus. Additionally, although the oat dough can be processed into pasta noodles by a pasta machine, pasta noodles made thereby are liable to break easily. Pasta noodles made of oat dough is also liable to become pasty during cooking. A flour composition containing a relatively large amount of non-wheat cereal components, such as oats and the like, and the noodle product produced therefrom have yet to be developed heretofore.

SUMMARY OF THE INVENTION

A benefit of the present invention is a flour composition containing a relatively large amount of non-wheat cereal components so as to overcome the aforesaid shortcomings of the prior art.

Another benefit of this invention is pasta noodles made from the flour composition of the present invention.

According to one aspect of the subject invention, a dry flour composition is mixed with added water for forming dough. The flour composition includes a wheat flour component and a non-wheat cereal component. The amount of the non-wheat cereal component is governed by the requirement that the overall dough must contain at least 6% by weight crude protein based on the total weight of the dry flour composition in the absence of added water. The dry flour composition may contain an additive, which is selected from a group consisting of wheat gluten protein and Curdlan gum, in an amount sufficient to provide a net-like structure for the dough.

According to another aspect, the present invention comprises pasta noodles prepared from the aforesaid dry flour composition.

The subject invention, therefore, comprises pasta noodles that have wheat grain and non-wheat grain in sufficient quantities as will form a matrix to provide the appropriate texture to the pasta noodles. More particularly, the pasta noodles will contain wheat grain, wheat gluten, and oats in sufficient proportion and quantity to yield a pasta noodle with a firm, chewy texture.

DETAILED DESCRIPTION OF THE PREFERRED EMBODIMENTS

The wheat flour component used in the present invention may include wheat gluten flour alone or a mixture of wheat gluten flour and soft or hard wheat flour. The wheat flour component provides crude protein, which contains wheat gluten protein. The wheat flour component is added to the dry flour composition in an amount sufficient to provide at least 6% by weight, preferably 6-20% by weight, more preferably 10-18% by weight, of crude protein, based on the total weight of the dry flour composition. When the crude protein content is higher than 20%, the pasta noodle obtained therefrom begins to have unacceptable harder mouthfeel characteristics. When the crude protein content is lower than 6%, the pasta noodle-exhibits unacceptably softer mouthfeel characteristics. In addition, when the crude protein content is less than 6% by weight, the pasta noodle produced therefrom exhibits mouthfeel characteristics similar to that of a rice noodle having low chewability and elasticity. When the crude protein content is higher than 6% by weight, the resulting noodles exhibit improved and acceptable elasticity and chewability. The crude protein supplies gluten, which functions as a matrix to provide a net-like structure which binds the oat content. The soft or hard wheat cannot supply the gluten unless present in large quantities, thus it can be supplemented with wheat gluten flour to provide the necessary, 6-20% crude protein content. Thus, a combination of soft or hard wheat, wheat gluten, and oats may be necessary in order to yield a pasta noodle with acceptable mouthfeel, texture, firmness and stickiness.

While not necessary for use in the subject invention, durum wheat or semolina may be incorporated in small amounts. More specifically, as stated above, at least 6% crude protein is required from this combination of grains. Thus, if 8% crude protein is desired and if the wheat gluten flour used is 80% crude protein and the wheat flour used is 16% crude protein, then utilizing the formula:

$$8\% = 80\% \, x + 16\% \, y$$

$x$=wheat gluten flour % in dough (dry weight)
$y$=soft or hard wheat flour % in dough (dry weight) and the formula:

$$x+y+z=100\%$$

$z$=oat flour % in dough (dry weight) one can ascertain the necessary percentages of the ingredients in the pasta noodle dry flour.

Different percentages of crude protein and oat flour content will present different textures of pasta noodle. If the crude protein is less than 6%, as stated, the texture is loose and soft, and not acceptable. Preferably, if the amount of crude protein is 14-18%, the texture has been found to be optimal. Of course, durum wheat and semolina may be used in conjunction with the subject invention to conform to various desired tastes and effects, and still remain within the scope of the subject invention.

In a health food application, 75% oat flour may be required. Therefore, at least 20% wheat gluten flour is required to provide the necessary structure and texture to the pasta noodle.

Curdlan gum may be used as an additive in the dry flour composition of the present invention to provide more structure to the pasta noodle. Curdlan gum is a natural polysaccharide ($\beta$-1, 3-glucan) produced by pure culture fermentation from the bacterium *Alcallgene faecalis var. Myxogenes*. Curdlan gum is a moderate molecular weight (DP-450) unbranched linear 1→3 $\beta$-D glucan (molecular weight~100 K) with no side chains. Curdlan gum can be added alone, or together with gluten protein flour, to the dry flour composition as an ingredient for providing the net-like structure for the dough. Curdlan gum is usually used in food processing as a gelling agent and produces a weak low-set gel if heated to 60° C. and then cooled to below 40° C. However, if the temperature is greater than 80° C., Curdlan gum may produce a stronger thermo-irreversible gel. Since pasta noodles are usually required to be cooked at a temperature higher than 80° C. and subsequently cooled, the pasta noodle may exhibit different characteristics at different temperatures.

The amount of oats utilized can be increased with the use of a proper amount of Curdlan gum in the oat-containing flour composition. The elasticity of the pasta noodle can be improved by such addition, and the stickiness of the pasta noodle can be decreased as well. When Curdlan gum is added along with a wheat gluten protein, the amount of Curdlan gum is 0.1 to 1.5% by weight based on the total weight of the dry flour composition. When Curdlan gum is added alone without the use of a wheat gluten protein, the amount of Curdlan gum is 7.5 to 15% by weight based on the total weight of the dry flour composition.

Furthermore, since about 20% of the water soluble and salt soluble protein is contained in the hard or soft wheat flour, salt can be added to the flour composition along with water for further enhancing the formation of the net-like structure of the dough. The amount of the salt is generally less than 2% by weight, preferably less than 1.5% by weight, and more preferably 0.1 to 1.5% by weight, based on the total weight of the dry flour composition.

Other features and advantages of the present invention will become apparent in the following detailed description of the preferred embodiments.

Examples

Materials Used in the Examples:
1. Oat flour: supplied by grinding an Australian species of oat into the flour;
2. Wheat gluten flour: containing more than 60% gluten, and having 80% crude protein as measured in a laboratory;
3. Wheat flour: containing 14% crude protein;

4. Salt: more than 99.5% purity; and
5. Curdlan gum: containing more than 98.6% of plant fiber, supplied by Takeda Chemical Industries Ltd., Japan.

Equipment:
1. Machine for making the conventional noodles:
   Maximum productivity: 200 kg/hr;
   Dried noodle: 1.1 mm in thickness and 1.8 mm in width;
   Including mixing original materials, dough sheeting, combining of two sheets, rolling, cutting, and steaming units;
2. Pasta machine:
   Maximum productivity: 30 kg/hr;
   Dried pasta noodle: 1.1 mm in thickness and 5.0 mm in width;
   A laboratory pasta machine supplied by La Parmigiana Corp., Italy; and
3. Drying apparatus:
   An oven with temperature and humidity control.

Analysis Method:
1. Sensory Analysis:
   The qualities of pasta noodle were judged by five tasters after cooking in water for 5 minutes and draining off water in terms of turbidity of water, chewability, and elasticity. The sensory analysis result for each of the properties was classified in five classes:
   Turbidity of water: 1: Not turbid; 2: Slightly turbid; 3: Medium turbid; 4: Turbid; and 5: Very turbid;
   Chewability: 1: No chewiness; 2: Slight chewiness; 3: Medium chewiness; 4: Noticeable chewiness; and 5: High chewiness; and
   Elasticity: 1: Not elastic; 2: Slight elastic; 3: Medium elastic; 4: Elastic; and 5: Very elastic.
2. Measurements were conducted by a texture analyzer available from Stable Micro Systems Corp.
   50 grams of the noodle product were cooked in 500 mil of boiling water for 5 minutes, and were subsequently soaked in cold water, strained, and cooled to an ambient temperature. Five noodle strands were analyzed by the texture analyzer. A probe was used for detecting the firmness (Pasta Firmness RIG code HDP/PES) of the pasta noodle strands. Forces required to compress the pasta noodle strands were measured. The measurement parameters were:
   Pretest Speed: 1.0 mm/s;
   Test Speed: 0.5 mm/s;
   Post Test Speed: 10.0 mm/s; and
   Distance: 90%.
   The texture, stickiness and firmness of the samples of the pasta noodle products were analyzed under the conditions of the constant speed and pressure. Stickiness and firmness are represented by $g/cm^2$.
3. Turbidimeter Measurement:
   The turbidimeter is Model 2100P Portable Turbidimeter manufactured by HACH Corp.
   50 grams of the pasta noodle product were cooled in 500 ml of boiling water for 5 minutes, and were subsequently strained to remove the water. The turbidity of the water was measured by the turbidimeter. The readings of the turbidimeter were shown in terms of NTU. The higher the reading, the higher is the turbidity.
   The results of the texture analyzer measurement and the turbidimeter measurement were compared with the result of the sensory judgment.

Examples 1 to 14

The dry flour composition of each of the examples contained a wheat flour component which includes wheat gluten flour or wheat gluten flour plus wheat flour. The examples included 8% or more crude protein. After the addition of water, the flour compositions were processed through dough sheeting, combining of two sheets, rolling, cutting, steaming and drying using a conventional machine for producing the pasta noodle. The characteristics of the pasta noodle products were analyzed with the use of the texture analyzer. The results are shown in Table 1.

TABLE 1

| Example No. | Mixture of wheat gluten flour and wheat flour Parts by Weight | Crude protein % provided by the mixture of wheat gluten flour and wheat flour Parts by Weight | Oat flour Parts by Weight | Texture | |
|---|---|---|---|---|---|
| | | | | Firmness $g/cm^2$ | Stickiness $g/cm^2$ |
| 1 | 10 | 8 | 90 | 1330 | 412 |
| 2 | 70 | 12 | 30 | 2034 | 449 |
| 3 | 60 | | 40 | 2053 | 421 |
| 4 | 50 | | 50 | 2054 | 429 |
| 5 | 40 | | 60 | 2011 | 429 |
| 6 | 30 | | 70 | 2036 | 437 |
| 7 | 20 | | 80 | 1952 | 421 |
| 8 | 15 | | 85 | 1945 | 434 |
| 9 | 70 | 16 | 30 | 2761 | 393 |
| 10 | 60 | | 40 | 2717 | 395 |
| 11 | 50 | | 50 | 2708 | 364 |
| 12 | 40 | | 60 | 2706 | 398 |
| 13 | 30 | | 70 | 2634 | 387 |
| 14 | 20 | | 80 | 2669 | 373 |

It is shown in Table 1 that the pasta noodle of Example 1, with 90% oat flour, has a firmness of 1330 $g/cm^2$, which is comparable to that of the present commercially available pasta noodle products. In Example 1, 8% of crude protein is entirely provided by 10% of the wheat gluten flour based on the dry flour composition. The other examples show that with the same amount of crude protein, even if the amount of oat flour is increased to 85 parts by weight, the firmness of the pasta noodle can be at least 2000 $g/cm^2$.

Examples 15 to 22

The dry oat-containing flour compositions in these examples were prepared by blending 75 parts by weight of oat flour with 25 parts by weight of a mixture of wheat gluten flour and wheat flour. The ratios of wheat gluten flour and wheat flour were adjusted to provide the amounts of the crude protein as shown in Table 2. 1.5 wt % of salt based on the total weight of the dry flour composition was added. The dry flour composition was then processed by dough sheeting, combing of two sheets, rolling, cutting, steaming and drying with the use of the conventional machine for producing the pasta noodle products. The qualities of the pasta noodle products were analyzed. The results are shown in Table 2.

TABLE 2

| Examples | | Sensory Score | | Texture | | Turbidimeter |
|---|---|---|---|---|---|---|
| No. | Crude Protein | Turbidity | Chewability | Elasticity | Firmness g/cm² | Stickiness G/cm² | NTU |
| 15 | 6% | 5 | 1 | 1 | 1365 | 453 | 56.3 |
| 16 | 8% | 5 | 2 | 1 | 1673 | 433 | 50.2 |
| 17 | 10% | 5 | 3 | 2 | 2054 | 426 | 30.1 |
| 18 | 12% | 4 | 3 | 3 | 3124 | 412 | 34.1 |
| 19 | 14% | 3 | 3 | 3 | 3674 | 401 | 30.5 |
| 20 | 16% | 2 | 3 | 3 | 4122 | 393 | 31.2 |
| 21 | 18% | 2 | 4 | 4 | 4512 | 400 | 29.8 |
| 22 | 20% | 2 | 5 | 5 | 4965 | 397 | 28.5 |

Examples 23 to 30

Examples 23 to 30 are identical to Examples 15 to 22 except that Examples 23 to 30 processed by the pasta machine into pasta noodle. The results are shown in Table 3.

TABLE 3

| Examples | | Sensory Score | | Texture | | Turbidimeter |
|---|---|---|---|---|---|---|
| No. | Crude Protein | Turbidity | Chewability | Elasticity | Firmness g/cm² | Stickiness G/cm² | NTU |
| 23 | 6% | 5 | 1 | 1 | 1344 | 304 | 63.8 |
| 24 | 8% | 5 | 1 | 1 | 1523 | 278 | 64.2 |
| 25 | 10% | 5 | 1 | 1 | 1634 | 269 | 63.5 |
| 26 | 12% | 4 | 1 | 1 | 1754 | 224 | 50.1 |
| 27 | 14% | 4 | 2 | 2 | 1869 | 223 | 48.2 |
| 28 | 16% | 4 | 2 | 2 | 2134 | 210 | 44.4 |
| 29 | 18% | 4 | 2 | 2 | 3223 | 205 | 46.7 |
| 30 | 20% | 4 | 2 | 2 | 3456 | 199 | 45.8 |

As shown in Tables 2 and 3, the dry oat-containing flour compositions of the examples were processed into the pasta noodle products by calendering by a conventional machine for producing the pasta noodles and by extruding by a pasta machine as well. The properties, such as chewability, elasticity, and firmness, improved as the amount of the crude protein increased. This means that the net-like structure of the pasta noodle product is being reinforced with the increase of crude protein. The stickiness is concomitantly lowered. This means that the tendency of forming a pasty substance from the starch upon cooking the noodles is lowered and indicates enhancement in chewability.

The firmness and the stickiness of the conventional pasta noodle after cooking are 1500-3000 g/cm² and 150-250 g/cm², respectively. As shown in Tables 1 to 3, when the flour compositions of this invention contain crude protein in an amount of at least 6% by weight based on the total weight of the dry flour composition, the pasta noodle products of the subject invention produced by calendering have the firmness comparable to that of the present commercially available pasta noodle products, no matter whether salt is added or not. When the flour composition of this invention contains more than 12% by weight of the crude protein, the pasta noodle products produced from the flour compositions added with salt therein have firmness higher than that of the present commercially available pasta noodle products, and have stickiness higher than that of the conventional pasta noodle.

Additionally, as shown in Table 3, the pasta noodle products produced by extruding the flour compositions containing 6-20% by weight of crude protein via the pasta machine have the chewability, the elasticity, and the firmness preferred by customers. However, the mouthfeel thereof is not exactly that of a commercial pasta noodle, though tastes may vary. Therefore, it may be necessary to conform to certain regional tastes by adding more wheat gluten or optionally Curdlan gum to increase the amount of the crude protein.

Examples 31 to 35

Examples 31 to 35 contain 80% by weight of oat flour and 20% by weight of wheat gluten flour. The amount of aqueous salt solution added to the flour compositions were varied. Each of the flour compositions was processed through mixing, sheeting, combining, rolling, cutting, steaming and straining with the use of a conventional calendering machine for producing the pasta dough into calendered pasta noodle products. The qualities of the pasta noodle products were analyzed. The results are shown in Table 4.

TABLE 4

| Examples | | Sensory Score | | Texture | | Turbidimeter |
|---|---|---|---|---|---|---|
| | Salt | | | Firmness | Stickiness | |
| No. | w/w % | Turbidity | Chewability | Elasticity | g/cm$^2$ | G/cm$^2$ | NTU |
| 31 | 0 | 2 | 3 | 3 | 3040 | 409 | 24.7 |
| 32 | 0.5 | 2 | 3 | 3 | 3478 | 397 | 25.5 |
| 33 | 1.0 | 2 | 3 | 3 | 3980 | 393 | 25.0 |
| 34 | 1.5 | 2 | 3 | 3 | 4023 | 387 | 30.5 |
| 35 | 2.0 | 2 | 3 | 3 | 4024 | 386 | 24.8 |

Examples 36 to 40

The flour compositions of Examples 36 to 40 are identical to Examples 31 to 35, except that the flour compositions of Examples 36 to 40 were extruded by an extrusion pasta machine into pasta noodle. The results are shown in Table 5.

TABLE 5

| Examples | | Sensory Score | | Texture | | Turbidimeter |
|---|---|---|---|---|---|---|
| | Salt | | | Firmness | Stickiness | |
| No. | w/w % | Turbidity | Chewability | Elasticity | g/cm$^2$ | G/cm$^2$ | NTU |
| 36 | 0 | 4 | 2 | 2 | 2143 | 242 | 34.4 |
| 37 | 0.5 | 4 | 2 | 2 | 2156 | 232 | 32.5 |
| 38 | 1.0 | 4 | 2 | 2 | 2187 | 234 | 32.0 |
| 39 | 1.5 | 4 | 2 | 2 | 2167 | 222 | 31.2 |
| 40 | 2.0 | 4 | 2 | 2 | 2198 | 223 | 32.8 |

As shown in Table 4, the pasta noodles produced by calendering may be affected by the added amounts of salt. In an amount of salt ranging from 0 to 1.5% by dry weight, the firmness is increased as the amount of the salt increased. The firmness of the noodles of Example 31, which did not have added salt, is ¼ lower than that of the noodles of Example 34, which had added 1.5% salt. However, if the added amount of salt is over 1.5%, the firmness of the pasta noodles does not increase further. It is evident that 1.5% of salt is a sufficient added amount for affecting the salt soluble protein contained in the flour compositions. It is shown in Table 5 that the firmness of the pasta noodle produced by extruding is not affected by adding the salt.

Examples 41 to 45

Each of the dry flour compositions used in these examples contained 80% by weight of oat flour and 20% by weight of wheat gluten flour. Additionally, 1.5% (w/w) of salt and a varying amount of Curdlan were added in each of the flour compositions. Each of the flour composition was processed through mixing, sheeting, combining, rolling, cutting, steaming and drying with the use of the calendering machine for producing the conventional pasta noodles into the pasta noodle products. The qualities of the pasta noodle products are analyzed. The results are shown in Table 6.

TABLE 6

| Examples | | Sensory Score | | Texture | | Turbidimeter |
|---|---|---|---|---|---|---|
| | Curdlan | | | Firmness | Stickiness | |
| No. | % | Turbidity | Chewability | Elasticity | g/cm$^2$ | G/cm$^2$ | NTU |
| 41 | 0 | 2 | 3 | 3 | 4049 | 373 | 30.4 |
| 42 | 0.5 | 2 | 3 | 3 | 4165 | 390 | 31.5 |
| 43 | 1.0 | 2 | 3 | 3 | 4480 | 464 | 32.1 |
| 44 | 1.5 | 2 | 3 | 3 | 4475 | 404 | 31.5 |
| 45 | 2.0 | 2 | 3 | 3 | 4473 | 489 | 32.4 |

Examples 46 to 50

The flour compositions of Examples 46 to 50 are identical to those of Examples 46 to 50, except that the flour compositions of Examples 46 to 50 were extruded by the extrusion pasta machine into pasta noodles. The results are shown in Table 7.

TABLE 7

| Examples | | | | Texture | | |
|---|---|---|---|---|---|---|
| | Curdlan | Sensory Score | | Firmness | Stickiness | Turbidimeter |
| No. | % | Turbidity | Chewability | Elasticity | g/cm² | G/cm² | NTU |
| 46 | 0 | 4 | 2 | 2 | 2123 | 208 | 31.4 |
| 47 | 0.5 | 4 | 2 | 2 | 1943 | 219 | 31.6 |
| 48 | 1.0 | 4 | 2 | 2 | 1978 | 219 | 32.4 |
| 49 | 1.5 | 4 | 2 | 2 | 1978 | 215 | 32.5 |
| 50 | 2.0 | 4 | 2 | 2 | 1854 | 236 | 32.6 |

As shown in Table 6, the firmness of the food products produced by calendering is effectively increased by adding Curdlan gum while maintaining the sensory scales. That is to say, the net-like or matrix structure formed by gluten can be reinforced by adding Curdlan gum to the flour composition. However, when the added amount of Curdlan gum is over 1%, the firmness of the pasta noodle products does not further increase. Also, the addition of Curdlan gum has no effect on the stickiness of the pasta noodle products. It is evident that the matrix formed by Curdlan gum is not like that formed by gluten protein, which contains fine starch granules of oat within the matrix. It is shown in Table 7 that the properties of the pasta noodle products produced by extruding are not affected by adding Curdlan gum.

Furthermore, when Curdlan gum is used alone, without addition of wheat gluten flour and wheat flour, as the additive to provide the matrix of the dough, the added amount ranging from 7.5 to 15.0% is appropriate for obtaining the desired properties. On the other hand, when 10% by weight of Curdlan gum and 10% by weight of wheat gluten flour were added respectively to 90% by weight of oat flour to prepare flour compositions, and when the flour compositions are processed by extruding into pasta noodles, the pasta noodles produced by using only 10% by weight of Curdlan gum is firmer and stickier (470 g/cm² vs. 278 g/cm²) than that produced by using 10% by weight of the wheat gluten flour in addition to Curdlan gum. It was also found that when only Curdlan gum is used as the additive for providing the matrix of the dough, the dough is not easily calendered to form pasta noodles, whether it is heated or not.

Cooking Test for the Oat-Containing Pasta Noodle Products Produced by Calendering:

A dry flour composition containing 75% of oat flour and 25% of wheat gluten flour was used. 1.5% of salt was further added to the flour composition. The pasta noodle product was produced by calendering, and was cooked in water for testing the cooking characteristics thereof. The results are shown in Table 8.

TABLE 8

| Cooking Time | Texture | |
|---|---|---|
| Minutes | Firmness g/cm² | Stickiness g/cm² |
| 5.0 | 4484 | 417 |
| 7.5 | 4431 | 308 |
| 10.0 | 3954 | 239 |
| 12.5 | 3916 | 198 |
| 15.0 | 3851 | 197 |
| 20.0 | 3145 | 141 |
| 30.0 | 2960 | 108 |

Table 8 shows that the pasta noodle product, after cooking for 30 minutes, has a firmness of about 3000 g/cm², and exhibits a good mouthfeel property. The pasta noodle product after cooking, washing and straining, has a mouthfeel property similar to that of the commercially available pasta.

Other Cereals

The examples in Table 9 respectively contain 80% by weight of the named cereals. 18.5% by weight of wheat gluten flour and 1.5% of salt are added to each example. The pasta noodle products are produced by calendering, and are tested by the texture analyzer. The results are shown in Table 9.

TABLE 9

| | Texture | |
|---|---|---|
| Examples | Firmness g/cm² | Stickiness g/cm² |
| Buckwheat | 2187 | 110 |
| Barley | 1688 | 146 |
| Rice | 1968 | 161 |
| Brown Rice | 2772 | 217 |
| Chinese Yam | 2865 | 204 |

From Table 9 one may conclude that this invention can be used with other cereals to produce the pasta noodle products containing a high amount of non-wheat cereals, other than oats.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A dry pasta flour product to be mixed with water for forming a dough, the dry pasta flour product comprising up to 50% by weight wheat flour component comprising (a) wheat gluten flour or (b) wheat gluten flour plus wheat flour, and at least 50% oat flour, said wheat flour component providing from about 6-20% crude protein, based on the total weight of said dry flour composition and the percentage of said oat flour and said wheat flour component being by weight based on the total weight of said dry flour composition.

2. The dry pasta flour product of claim 1, further including curdlan gum.

3. The dry pasta flour product of claim 2, further including curdlan gum in an amount of from 0.1% to 1.5% by weight based on the total weight of said dry flour composition.

4. The dry pasta flour product of claim 1, further including curdlan gum in an amount of from 7.5% to 15% by weight based on the total weight of said dry flour composition.

5. The dry pasta flour product of claim 1, further including salt.

6. The dry pasta flour product of claim 5, wherein the amount of said salt is 0.1 to 1.5% by weight based on the total weight of said dry pasta flour product.

7. A dry pasta flour product having ingredients comprising:
   wheat flour, wheat gluten flour, and oat flour, wherein the wheat flour, wheat gluten flour and oat flour are combined to form said dry flour composition and the amount of crude protein in said wheat flour and the amount of crude protein in said wheat gluten flour combine for a total crude protein content about 10-18% of said dry flow composition thereby providing a matrix structure in a resulting dough, and the oat flour is at least 50% by weight of the total weight of said dry pasta flour product.

8. The dry pasta flour product of claim 7, wherein said resulting dough is produced by calendaring.

9. The dry pasta flour product of claim 7, wherein said resulting dough is produced by extrusion.

10. A dough product prepared from the dry pasta flour product of claim 7.

11. A pasta noodle prepared from the dry pasta flour product of claim 7.

12. A pasta dough prepared by adding water to a dry pasta flour product mixture comprising wheat flour, wheat gluten flour, and oat flour, wherein the wheat flour, wheat gluten flour and oat flour are combined to form said dry flour mixture and the amount of crude protein in said wheat flour and the amount of crude protein in said wheat gluten flour combine for a total of about 6-20% of said dry flour mixture thereby providing a matrix structure, in the dough, and the oat flour is at least 50% by weight of the total weight of said dry pasta flour product mixture.

13. A method of preparing a pasta dough, comprising the steps of combining wheat flour, wheat gluten flour and oat flour to form a dry pasta flour mixture, adding water to said dry pasta flour mixture, controlling the amount of crude protein in said wheat flour and the amount of crude protein in said wheat gluten flour to provide a total of about 6-20% of crude protein in said dry pasta flour mixture, thereby providing a matrix structure in the dough, and the oat flour is at least 50% by weight of the total weight of said dry pasta flour composition.

14. The method of claim 13 including the further step of extruding the dough to form a pasta noodle.

15. The method of claim 13 including the further step of calendaring the dough to form a pasta noodle.

16. The method of claim 13 including the further step of adding curdlan gum.

* * * * *